US005979891A

United States Patent [19]

Roux

[11] Patent Number: 5,979,891

[45] Date of Patent: Nov. 9, 1999

[54] DEVICE FOR SELECTING CUT PAPERBOARD BLANKS

[75] Inventor: Jean-Pierre Roux, Ardon, France

[73] Assignee: Komori-Chambon S.A., Orleans-Cedex, France

[21] Appl. No.: 08/750,453

[22] PCT Filed: Apr. 11, 1996

[86] PCT No.: PCT/FR96/00550

§ 371 Date: Dec. 6, 1996

§ 102(e) Date: Dec. 6, 1996

[87] PCT Pub. No.: WO96/32206

PCT Pub. Date: Oct. 17, 1996

[30] Foreign Application Priority Data

Apr. 11, 1995 [FR] France .................................... 9504339

[51] Int. Cl.[6] ............................ B65H 5/00; B65H 39/10; B65G 42/26

[52] U.S. Cl. .......................... 271/225; 271/303; 198/442; 209/900

[58] Field of Search .................................... 271/225, 287, 271/303, 305; 209/638, 900; D18/47; 198/367, 442

[56] References Cited

U.S. PATENT DOCUMENTS

| | | | |
|---|---|---|---|
| 3,264,917 | 8/1966 | Califano et al. | 83/94 |
| 3,791,516 | 2/1974 | Tramposch | 209/74 |
| 4,102,253 | 7/1978 | Gennicott | 93/93 |
| 4,120,491 | 10/1978 | Lang | 271/64 |
| 4,570,922 | 2/1986 | Akers . | |
| 4,747,493 | 5/1988 | Nakinishi | 209/534 |

FOREIGN PATENT DOCUMENTS

| | | |
|---|---|---|
| 0 509 428 | 10/1992 | European Pat. Off. . |
| 1 169 277 | 4/1964 | Germany . |
| 2 154 207 | 5/1973 | Germany . |

*Primary Examiner*—William E. Terrell
*Assistant Examiner*—Ku Bower
*Attorney, Agent, or Firm*—Young & Thompson

[57] ABSTRACT

A device for selecting cut paperboard blanks has two series of drive belts detining two paths tor the blanks, namely an upper path and a lower path each of which is defined between drive belts. The upper and lower paths diverge from each other in the device. A flap that is disposed where the paths diverge from each other is pivotally mounted about a downstream shaft and is capable of occupying two positions, namely, a lower position in which the blanks are fed to the upper path and an upper position in which the blanks are fed to the lower path. Each of the paths has an upstream portion from the flap and a downstream portion from the flap and each of the paths is more steeply inclined relative to the horizontal in one of its upstream and downstream portions than in the other of its upstream and downstream portions. The paths are more steeply inclined at the same portion, upstream or downstream, for both of the paths, whereby the downstream paths both diverge to the same side, of a plane occupied by the blanks upstream from the flap, from the direction of the upstream path. One path of the drive belts driving the blanks is curved at least in the upstream and downstream portions adjacent to the pivotable flap.

8 Claims, 3 Drawing Sheets

FIG.1
"PRIOR ART"
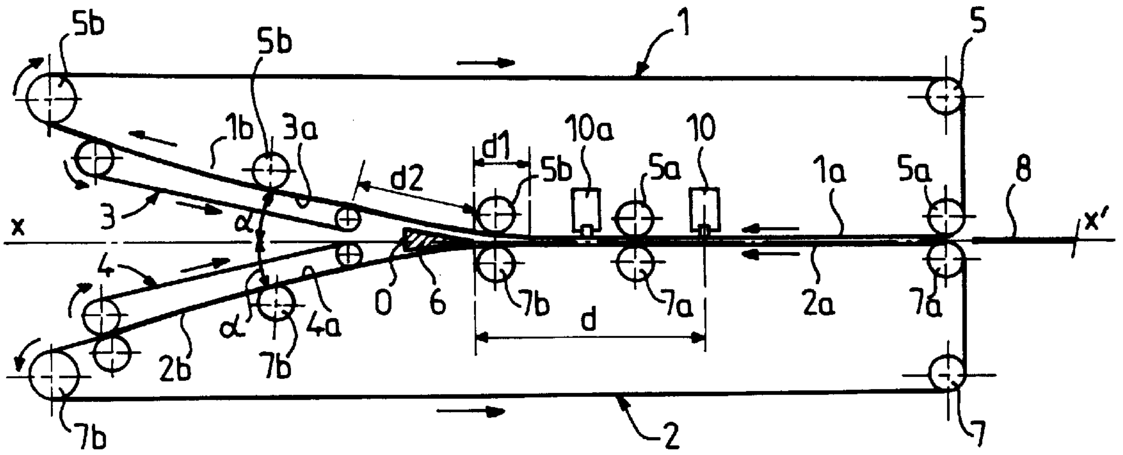
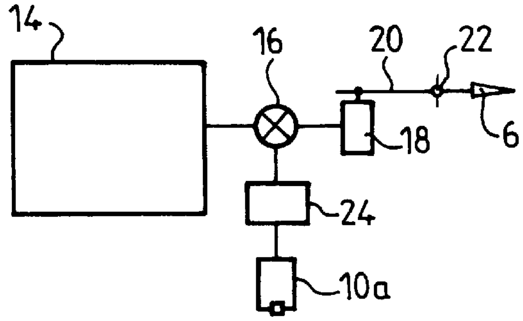
FIG. 2

DEVICE FOR SELECTING CUT PAPERBOARD BLANKS

The present invention relates to a device intended to effect a selection of cut paper- or cardboard blanks on a dispensing machine, in particular in order to eliminate from a flow or products those which are considered as defective. The present invention relates in particular to a selection device enabling the rate of selection to be very appreciably improved.

It is known that, after an operation of cutting out a web of paper- or cardboard, during which a flow of paper- or cardboard blanks and in particular cases, are formed, certain of the latter may prove to be defective. Such defective blanks are most often eliminated at the level of reception of the cases, which causes both a loss of time and a complication of the production process.

One solution consists in making this selection during displacement of the blanks, before they are received, so as to eliminate the additional sorting operation. It is known that one difficulty of such a modus operandi comes from the high speed of advance of these blanks which involves extremely rapid and precise selection means.

In annexed techniques, sorters have been used, capable of sorting products of about 30 cm in length in displacement at a speed of the order of 180 m/min, which represents a selection of 600 products per minute. Under such conditions, it is estimated that the reliability of sorting is of the order of 99.7%.

It is an object of the present invention to propose a selection device able to improve both the number of possible selections per minute and the reliability thereof.

The present invention thus has for an object a device for selecting cut paperboard blanks as they are fed between at least two series of drive belts defining two paths for the blanks, namely an upper path and a lower path forming an angle of bifurcation, this device comprising a path selection means consisting of a flap disposed in the angle of bifurcation of the two paths, and which is pivotably mounted about a downstream shaft capable of being placed in two positions, i.e. a lower, normal operating position in which the blanks are fed to the upper path, and an upper, selection position in which the blanks are fed to the lower path, characterized in that:

the upper path of the drive belts driving the blanks is curved, at least in the upstream and downstream portions adjacent to the pivotable flap, with a substantially uniform radius of curvature, and the upper rear surface of the flap has a curvature adjacent to that of the belt extending thereabove, so that, in the selection position, it defines therewith a substantially parallel path.

In one form of embodiment of the invention, the concavity of the curve is oriented towards the flap and the front part of the upper surface or the flap is incurved downwardly.

In another form of embodiment of the invention, the lower path of the belts driving the blanks, at least in the upstream and downstream parts close to the pivotable flap, forms a curve of which the radius of curvature is substantially uniform, the concavity of the curve preferably being oriented away from the flap. Furthermore, the lower surface of the flap may present a curvature close to that of the belt extending therebelow, so that, in position of normal operation, it defines therewith a substantially parallel path.

The device according to the invention preferably comprises means adapted to maintain the cardboard blank, at least at the moment of its passage at the level of the flap, over at least a part of its surface, between two holding elements of which at least one is constituted by a belt side. The other holding element may be constituted by another belt side or by a roller.

In one form of embodiment of the invention, the device comprises at least four belt which define the two upper and lower paths. In this device, upstream of the flap, a first portion of the lower side of a first belt or upper belt, and a first portion of the upper side of a second belt, or lower belt, are in contact, and downstream of the flap, a second portion of the lower side of the first belt is in contact with the upper side of a third belt and a second portion of the upper side of the second belt is in contact with the lower side of a fourth belt. An upper side of the fourth belt may also be in contact with the lower side of the third belt.

The device according to the invention is particularly suitable for a production of modular type. Each module will thus comprise its own mechanical drive system, constituted in particular by four belts, and its own selection system, constituted by a pivotably mounted flap. This flap may be mounted on a lever mobile about a downstream axis of rotation under the action of a jack controlled by a rapid pneumatic valve supplied by a reservoir of pressurized air. It is thus particularly easy to modify the relative positioning of several modules as a function of the different specific applications of the apparatus.

All the mechanical elements of the device may preferably be disposed on a single plate so as to constitute a module which is adjustable and positionable in autonomous manner.

A form of embodiment of the present invention will be described hereinafter by way of non-limiting example, with reference to the accompanying drawings, in which:

FIG. 1 is a schematic plan view showing the operational principle of a selector device according to the invention.

FIG. 2 is a diagram illustrating the functioning of the selection means employed in the device according to the invention.

Figure 3A:
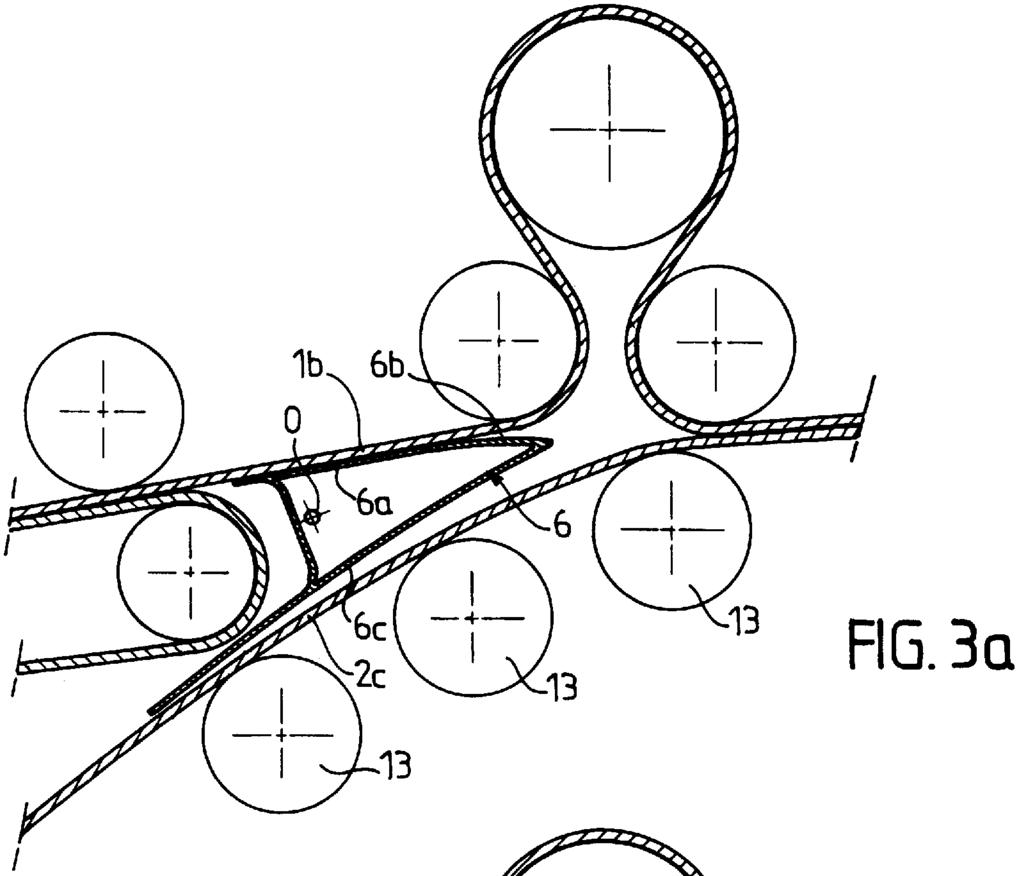
Figure 3B:
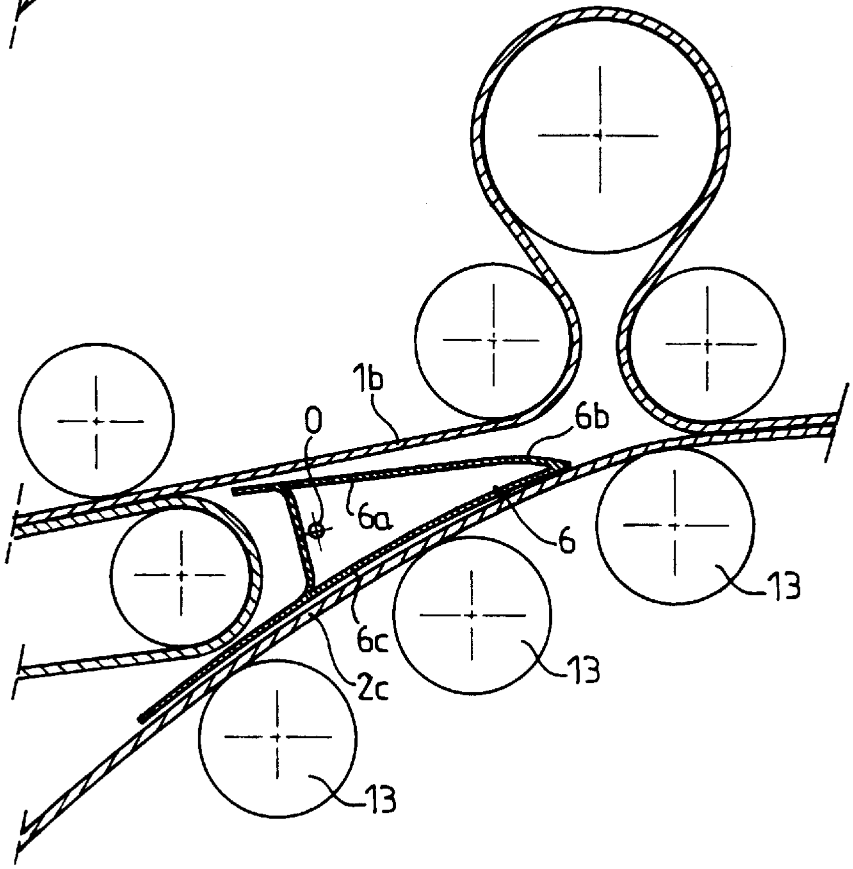

FIGS. 3*a* and 3*b* are partial vertical and longitudinal sections, enlarged, showing the zone of bifurcation of the two paths and the selection flap respectively in upper and lower position.

Figure 4:
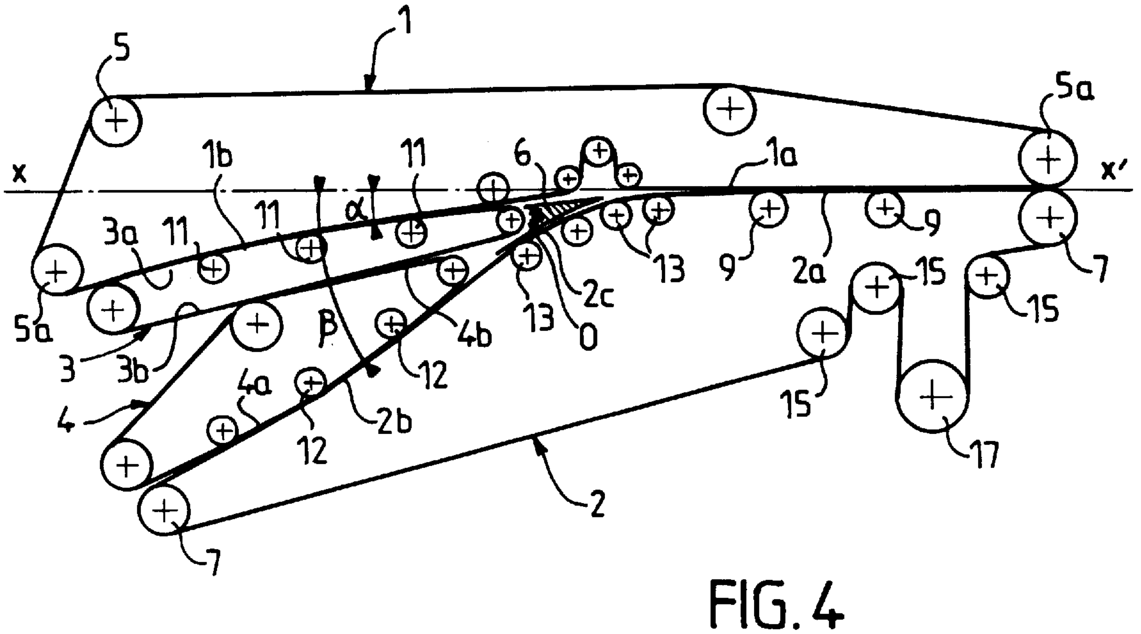

FIG. 4 is a schematic plan view of a variant of the embodiment shown in FIG. 1.

Figure 5:
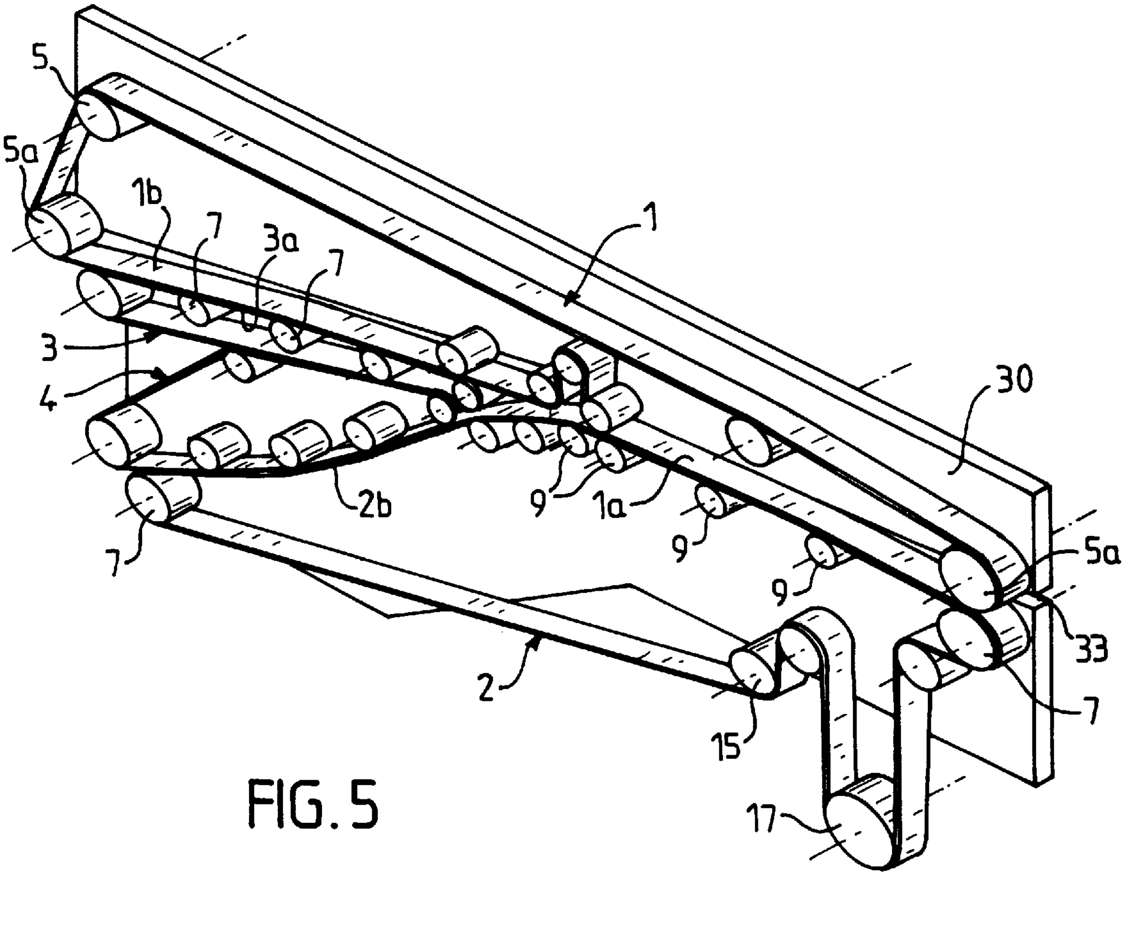

FIG. 5 is a view in perspective of the variant shown in FIG. 4, the selection means having been removed.

In FIG. 1, the device according to the invention is essentially constituted by four belts disposed symmetrically in two's with respect to a longitudinal axis xx'. The first and second belt, upper 1 and lower 2 respectively, are wound on rollers 5, 5*a* and 7, 7*a* so as to form an upper loop and a lower loop which are symmetrical with respect to the axis xx'. The two loops, from upstream to downstream, comprise a first zone in which two belt sides 1*a* and 2*a*, disposed respectively between two rollers 5*a*, 5*b* and 7*a*, 7*b*, are rectilinear and in contact with one another along axis xx'. A second zone is defined by three respective rollers 5*b*, 7*b* which give the following two belt sides 1*b* and 2*b*, on the one hand. a spaced apart relationship and, on the other hand, a regular curvature whose concavity is respectively alreclea upwardly and downwardly.

The device also comprises a third belt 3 whose upper side 3*a* is in contact with side 1*b* of the first belt 1, so as to follow the curvature thereof, and a fourth belt 4 whose lower side 4*a* is in contact with side 2*b* of the second belt 2, likewise so as to follow its curvature. These belts are driven in rotation by motors, not shown in the drawing. They are servo-controlled with one another, for example by means of notches, so that their speeds of displacement are as close as possible so as to avoid any slide. The direction of rotation of the belts is such as represented by the arrows in FIG. 1, namely a clockwise rotation for belts 1 and 4 and anti-clockwise rotation for belts 2 and 3.

The device also comprises selection means, constituted by a flap 6 mounted pivotably about a downstream shaft O parallel to the axes of rotation of the rollers 5 and 7. This flap 6 is adapted to occupy two positions, namely a lower position, or position of normal functioning (which corresponds for example to the passage of correct blanks), and an upper position, or selection position (which corresponds for example to a position of selection of defective blanks).

The upper face of the flap 6 presents a curvature of which the concavity is oriented upwardly and whose radius of curvature is such that, in lower position, it defines with the belt side 1*b* which extends thereabove, a parallel path. Similarly, the lower face of the flap 6 presents a curvature whose concavity is oriented downwardly and whose radius of curvature is such that, in upper position, it defines a parallel path with the belt side 2*b* which extends thereunder.

Applicants have observed that, by giving the upper path followed by the cardboard blank, or path of normal operation, a regular curvature in the upstream and downstream vicinity of the selection flap 6 and by giving the rear part of the upper face thereof a curve close to that of the belt which extended thereabove, it was possible lo increase in a considerable proportion the number of cardboard blanks able to be selected by the device. In fact, with the devices of the prior state of the art, it was possible to monitor the passage of about 600 blanks per minute with a number of operational incidents of the machine (pile-up) of about one in 24 hours of operation. The device according to the invention has made it possible to monitor the passage of 1000 cardboard blanks per minute with only one incident in 800 hours of operation.

This results not only in a possible increase in the yield of the machine, but also an increase in the reliability thereof.

Flap 6 is normally in lower position, but it many pass into upper position whenever a blank to be selected is detected. Such detection is effected by an anomaly detector 10 which may be of any type appropriate to the parameter that it is desired to control. Detector 10 is disposed at a distance d from the flap 6 which is sufficient in order that, taking into account the speed of displacement of the belts 1*a* and *2a* and therefore of a cardboard blank 8 transported, analysis means (not shown in the drawing) have the time to analyze said blank and to decide on the upper or lower path that it must follow. A second detector, or passage detector 10*a*, is disposed downstream of the anomaly detector 10, preferably near the flap 6, and controls upward tipping of the latter when the analysis means have decided on the passage of the blank 8 by the lower path. Under these conditions, operation of the selection device is effected as described hereinafter.

The cardboard blank 8 is admitted between sides 1*a* and 2*a* of the portion in contact of the first and second belts 1 and 2, and is driven thereby in the direction of the selection flap 6. When a selection is ordered by the detector 10, the flap 6, in a given time t1, tips upwardly and the blank 8 presented in front of flaw 6 is then fed thereby between the sides 2*b* and 4*a* of the belts 2 and 4. On the contrary, when no anomaly is detected, flap 6 remains in lower position and the cardboard blank 8 is in that case fed between the sides 1*b* and 3*a* of belts 1 and 3.

According to the invention, sides 1*a* and 2*a* of belts 1 and 2 are in contact, but are spaced from each other at a distance d1 from the front part of the flap 6. Furthermore, the zone of belt 3 most upstream is in contact with the side 1*b* at a distance d2 from the front part of the flap 6. The length of the cardboard blanks 8 must therefore be greater than the distance d1+d2 if it is desired that at least a part thereof be held at any moment by two sides of belt, namely sides 1*a* and 2*a* then sides 1*b* and 3*a*.

The selection means, as shown in FIG. 2, may comprise a reserve of pressurized air 14 which supplies a rapid-type electrovalve 16, which is itself connected to a jack 18. The latter acts on one end of an arm 20 mounted to pivot about a pin 22 which ends in flap 6. The electrovalve 16 is controlled by the sensor 10*a* via an interface 24. When a defective blank is detected by the anomaly detector 1, the detector 10*a* upon passage of the blank 8 controls opening of the rapid electrovalve 16 which enables the pressurized fluid contained in the reserve 14 to be admitted into the jack 18 whose piston moves downwardly, so that the lever 20 pivots about its axis 22, which has for its effect to displace the flap into upper position.

Other means for controlling the flap 6 may, of course, also be provided.

It is not necessary to ensure positive drive of each of belts 1 to 4, and it is also possible, according to the invention, to ensure such drive with the aid of one sole driving belt, the other belts in that case being driven by friction, either directly on the driving belt or indirectly step-by-step. On the device shown in FIG. 1, a positive drive of belt 2 alone may thus be ensured. Consequently the latter will ensure drive by friction of belt 1 and belt 4, belt 1 itself ensuring drive of belt 3.

FIG. 4 shows a form of embodiment of the invention in which the device also comprises two loops of belts, namely an upper loop and a lower loop respectively formed by a belt 1 and a belt 2. The lower side of belt 1 forms a curve of large radius (about 3 meters) between its two end rollers 5*a* of which the concavity is oriented downwardly. The lower side of the belt 1 is separated into two zones, namely an upstream zone 1*a* and a downstream zone 1*b*. Concavity is obtained by means, on the one hand, of rollers 9 which apply side 2*a* of belt 2 against zone 1*a* of belt 1 and give these two belts the desired curvature, and by rollers 11.

As before, belt 2 separates from belt 1 in a zone of bifurcation in which is disposed a flap 6, mounted to pivot about a downstream axis O. The upper side of the belt 2 comprises a first zone 2*a* which is curved, followed by a second zone 2*c* at the level of the zone of bifurcation, likewise curved with concavity oriented downwardly under the action of rollers 13 and of smaller radius of curvature, and by a third zone 2*b* whose concavity is oriented upwardly under the action of rollers 12.

As before, the device comprises two intermediate belts 3 and 4 which present such a shape that they are in contact with each other. The intermediate belt 3 is elongated in form and is disposed beneath zone 1*b* so that its upper side 3*a* is in contact with zone 1*b*. Rollers 11 give side 3*a* and zone 1*b* a curvature, with downwardly oriented concavity, which, apart from the advantage mentioned at present, also has for its effect to improve contact of the belts and therefore their mutual drive.

The lower loop formed by belt 2 terminates in a series of tension rollers 15 and a driving roller 17. Belts 3 and 4 are disposed so that the lower side 3*b* of belt 3 is in contact with the upper side 4*a* of belt 4. Such an arrangement makes it possible to drive all the belts by means of one sole drivina belt, namely belt 1 itself driven by driving roller 17.

In order to promote drive of the cardboard blanks 8 after they have passed the flap 6, the upper side 3*a* of belt 3 has been brought as near as possible to the downstream part of said flap. However, for reasons of bulk, the same cannot be done with the lower side 4*a* of belt 4. This is why, in order to ensure an efficient drive of the cardboard blank 8 by the lower path of the device, on the one hand, the lower face of the flap 6 is given a profiled shape following the curvature imposed on the belt 2 by the rollers 9 and, on the other hand, a greater quality of polish is given thereto so as to minimize the coefficients of friction of the cardboard blank 8 on this surface. Under these conditions, the upper face of side 2*c* of the belt 2 applies by rollers 13 the cardboard blank 8 against the lower face of flap 6, when the latter is in raised position and, the coefficient of friction of this lower face being much less than that of the belt, transfer of the blank 8 is thus ensured. The lower face of the flap 6 thus ensures, in cooperation with side 2*a* of belt 2, hold of the blank 8 before the latter is taken over by sides 2*a* and 4*a*.

FIGS. 3*a* and 3*b* show a particularly interesting embodiment of the invention in which the zone of bifurcation of the upper and lower paths constitutes an angle of about 20°, of which the sides are incurved, the two concavities being oriented downwardly. In this embodiment, the rear part 6*a* of the upper face of the flap 6 is parallel to the curvature of the belt side 1*b* which extends thereabove, when the flap 6 is in upper position, while its front part 6*b* is rathermore incurved downwardly. Furthermore, the lower face 6*c* of the flap 6 is parallel over the whole of its length to the belt side 2*c* which extends therebeneath when the flap 6 is in lower position.

Taking into account the rates of advance of the cardboard blanks which are employed by such devices, it may happen, as shown in FIG. 3*b*, that a cardboard blank 8 is engaged above the flap 6 when the latter receives the order to pass into upper position. The curved profile of the flap 6 enables it to push the blank 8 while remaining tangential thereto and having therewith a reduced contact surface, which minimizes frictions and promotes deflection of the blank 8.

It will also be noted that hold of the cardboard blank during its transfer may also be ensured by a roller.

The selection device according to the invention may be used with machines separating a cardboard band into any number of series of cardboard blanks. As a function of the specific use, it is interesting to be able to convert, easily and rapidly, a machine comprising a given number of selection devices disposed in parallel, into a machine presenting a different number of these selection devices.

The present invention lends itself particularly well to such a rapid conversion, insofar as it promotes the constitution of a modular structure.

Each of the basic modules of this structure comprises an assembly of belts and selection means constituted in particular by a pivotable flap and means for controlling the latter, so as to be completely independent. In this way, it is possible easily to have available, as a function of specific needs, the number of modules necessary for a determined application.

As shown in FIG. 5, such a module is essentially constituted by a plate 30 supporting shafts on which are rotatably mounted the various rollers 5, 7, 15, 17 about which are wound the upper (1) and lower (2) belts as well as the intermediate belts 3 and 4. Plate 30 is traversed by a slot 33 which extends from the side where the cardboard blanks 8 arrive and which is separated into two divergent slots at the level of the selection flap 6 so as to follow the path of the belts. This slot 33 makes it possible to use cardboard blanks 8 which present a width greater than that of belts 1, 2, 3, 4. Flap 6 as well as its actuation means are fixed on the side of the plate 30 where the rollers are arranaed. To render the drawing clearer, they are not shown therein. Similarly, the means for controlling the flap 6, for space-saving reasons, will preferably be disposed towards the plate 30 where the belts are installed.

I claim:

1. In a device for selecting cut paperboard blanks, two series of drive belts defining two paths for the blanks, namely an upper path and a lower path each of which is defined between drive belts, said upper and lower paths diverging from each other in the device, there being a flap disposed where said paths diverge from each other, said flap being pivotally mounted about a downstream shaft and being capable of occupying two positions, namely, a lower position in which the blanks are fed to the upper path and an upper position in which the blanks are fed to the lower path; the improvement wherein each of said paths has an upstream portion from the flap and a downstream portion from the flap and each of said paths being more steeply inclined relative to the horizontal in one of its upstream and downstream portions than in the other of its upstream and downstream portions, said paths being more steeply inclined at the same said portion, upstream or downstream, for both of said paths, whereby the downstream paths both diverge to the same side, of a plane occupied by the blanks upstream from the flap, from the direction of the upstream path, one said path of the drive belts driving the blanks being curved at least in the upstream and downstream portions adjacent to the pivotable flap.

2. A device as claimed in claim 1, said paths being more steeply inclined at the downstream end of both said paths.

3. A device as claimed in claim 1, wherein said paths are defined by at least three rollers over which said belts run, said at least three rollers having axes that do not lie in a common plane.

4. A device as claimed in claim 1, in which one of said belts is provided with mechanical means to drive said one belt and the other said belts are driven by friction on said one belt.

5. A device as claimed in claim 1, having all its mechanical elements disposed on a single plate so as to constitute a module that may be adjusted and positioned in an independent manner.

6. A device as claimed in claim 1, wherein the flap is mounted on a lever moveable about a downstream axis of rotation under the action of a jack controlled by a rapid pneumatic valve supplied by a reservoir of pressurized air.

7. A device as claimed in claim 1, wherein said flap has upper and lower surfaces one of which is convex and one of which is concave.

8. A device as claimed in claim 7, wherein said upper surface of the flap is convex and said lower surface of the flap is concave.

* * * * *